(12) United States Patent
Shiner et al.

(10) Patent No.: US 12,332,224 B2
(45) Date of Patent: Jun. 17, 2025

(54) GUARD COLUMN CONFIGURATIONS FOR SIZE EXCLUSION CHROMATOGRAPHY SEPARATIONS

(71) Applicant: Waters Technologies Corporation, Milford, MA (US)

(72) Inventors: Stephen James Shiner, Holden, MA (US); Frank J. Marszalkowski, Jr., Milford, MA (US); Steven M. Byrd, Ashland, MA (US); Raymond P. Fisk, Norton, MA (US); Mathew H. DeLano, Needham, MA (US); Lavelay Kizekai, Coventry, RI (US)

(73) Assignee: Waters Technolgies Corporation, Milford, MA (US)

( * ) Notice: Subject to any disclaimer, the term of this patent is extended or adjusted under 35 U.S.C. 154(b) by 204 days.

(21) Appl. No.: 17/231,853

(22) Filed: Apr. 15, 2021

(65) Prior Publication Data

US 2021/0325352 A1 Oct. 21, 2021

Related U.S. Application Data

(60) Provisional application No. 63/010,493, filed on Apr. 15, 2020.

(51) Int. Cl.
*B01D 15/34* (2006.01)
*B01D 15/22* (2006.01)
(Continued)

(52) U.S. Cl.
CPC ........... *G01N 30/606* (2013.01); *B01D 15/22* (2013.01); *B01D 15/34* (2013.01); *G01N 30/461* (2013.01);
(Continued)

(58) Field of Classification Search
CPC ............. G01N 30/606; G01N 30/6065; G01N 30/461; G01N 2030/085; B01D 15/34; B01D 15/22
See application file for complete search history.

(56) References Cited

U.S. PATENT DOCUMENTS 4,017,528 A 4/1977 Unger et al.
6,528,167 B2 3/2003 O'Gara
(Continued)

FOREIGN PATENT DOCUMENTS

DE 4106631 A1 * 9/1992 ............. B01D 15/22
WO WO-9534296 A1 * 12/1995 ............. A61K 31/05

OTHER PUBLICATIONS

Koza, Stephan, "Developing SEC methods for proteins and modified proteins" [online] Biopharma LC Meeting Oct. 16-17, 2012.*
(Continued)

*Primary Examiner* — Benjamin L Lebron
(74) *Attorney, Agent, or Firm* — WOMBLE BOND DICKINSON (US) LLP; Deborah M. Vernon; Ricardo Joseph

(57) ABSTRACT

Chromatographic systems for size exclusion chromatography (SEC) are provided that comprise an inlet, an outlet, an analytic column having a first interior volume that has a first length and a first cross-sectional area normal to the first length, the first interior volume containing a first stationary phase, and a guard column having a second interior volume that has a second length and a second cross-sectional area normal to the second length, the second interior volume containing a second stationary phase. The inlet is in fluid communication with the guard column, the guard column is in fluid communication with the analytic column, and the analytic column is in fluid communication with the outlet. Moreover, the second length is smaller than the first length,
(Continued)

and the second cross-sectional area is smaller than the first cross-sectional area.

19 Claims, 8 Drawing Sheets

(51) Int. Cl.
    *G01N 30/08*     (2006.01)
    *G01N 30/46*     (2006.01)
    *G01N 30/60*     (2006.01)

(52) U.S. Cl.
    CPC ... *G01N 30/6065* (2013.01); *G01N 2030/085* (2013.01)

(56) References Cited

U.S. PATENT DOCUMENTS

| | | | |
|---|---|---|---|
| 6,686,035 | B2 | 2/2004 | Jiang et al. |
| 7,175,913 | B2 | 2/2007 | O'Gara |
| 7,919,177 | B2 | 4/2011 | Jiang et al. |
| 2017/0173496 | A1* | 6/2017 | Stone ................ B01D 15/40 |
| 2019/0376933 | A1 | 12/2019 | Wyndham et al. |

OTHER PUBLICATIONS

Sepax Technologies, Inc., "TweenTrap Columns". Jun. 24, 2021.*
Sepax Technologies, "TweenTrap Column". Sep. 26, 2019.*
Shodex(TM), "Pretreatment column for column switching method". Retrieved Nov. 30, 2022.*
Tosoh Bioscience LLC, "TSKgel G3000SWxl". Retrieved Nov. 30, 2022.*
Machine translation of DE 4106631A1.*
Reid, T., and C. Sprout, "How to select the right LC guard column", Restek. Sep. 2016.*
Waters, "Column dimensions & related HPLC parameters". Jul. 2015.*
Swartz, M., "New chromatography columns and accessories for 2015", LCGC North America, vol. 33, Issue 4, pp. 232-247. (Year: 2015).*
Fukuda, J. et al., "Utilization of a precolumn with size exclusion and reversed-phase modes for size-exclusion chromatogrpahic analysis of polysorbate-containing protein aggregates", Journal of Chromatography B, 953:68-72 (2014).
Goewie, C., et al., "Optimization of Precolumn Design in Liquid Chromatography", Journal of Chromatography A 301:325-334 (1984).
Kaukonen, A.M., et al., "High-performance liquid chromatography methods for the separation and quantitation of spironolactone and its degradation products in aqueous formulations and of its metabolites in rat serum", Journal of Chromatography A 797(102):271-281 (1998).
Author unknown, "TSKgel SW-type Column Guide", [online] TOSOH Fisher Scientific [retrieved on Jun. 29, 2021]. Retrieved from Internet URL: https://ww.fishersci.com/content/dam/fishersci/en_US/documents/programs/scientific/brochures-and-catalogs/brochures/tosoh-bioscience-tskgel-sw-column-brochure.pdf.
International Search Report and Written Opinion for International application No. PCT/US2021/027511, mailed on Jul. 7, 2021, 11 pages.
Shiner et al. "VanGuard FIT: A Breakthrough in Guard column Performance for Challenging Chromatographic Separations." Waters. Mar. 2019.
Trident Integral Guard Cartridge System. Restek LC. (2008).
Trident LC Column Protection System. Restek LC. (2018). https://www.antteknik.com/Upload/ProductDoc/tr/650/Restek_Trident_GNSS2423A-UNV.pdf.

* cited by examiner

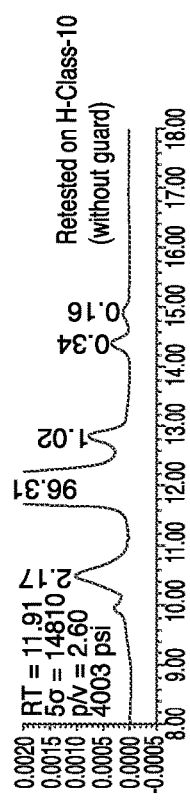
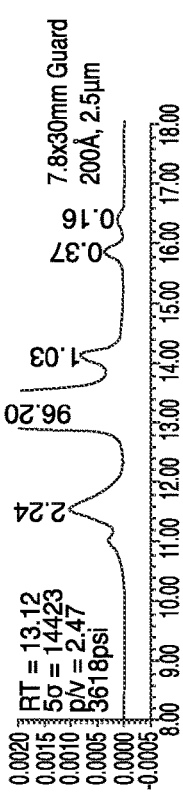
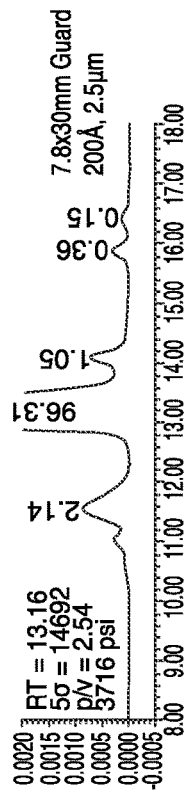
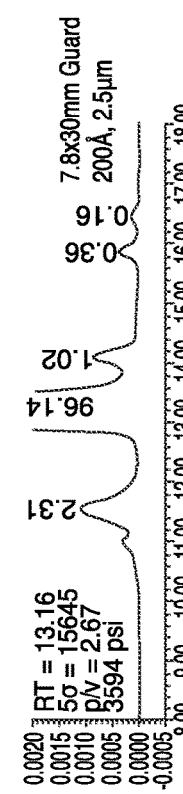
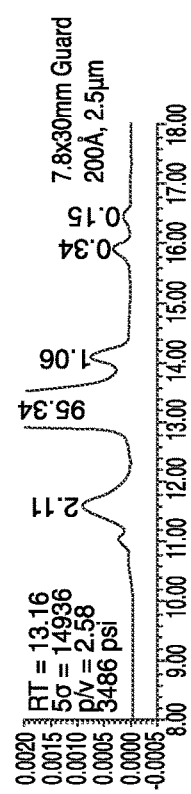
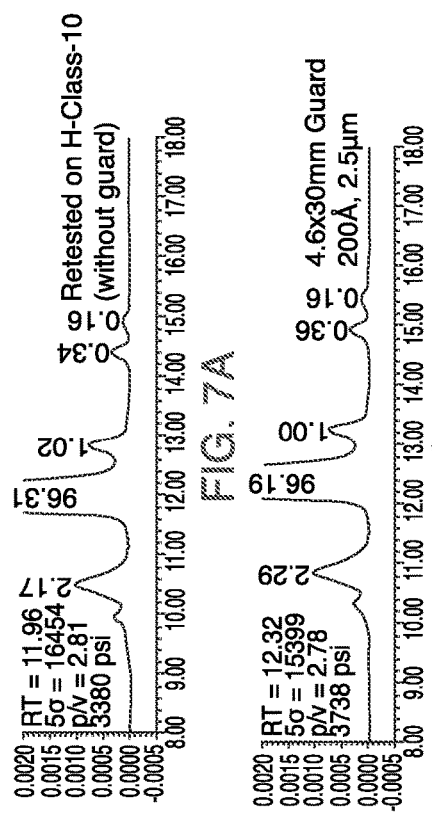
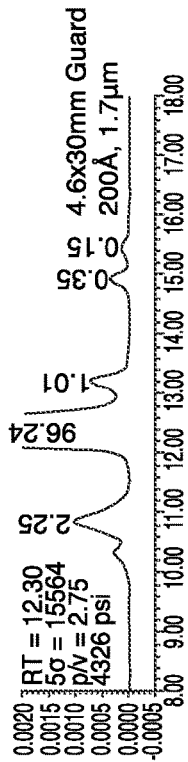
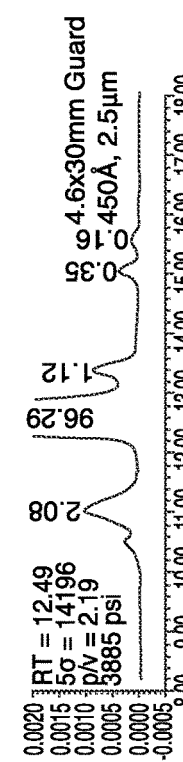
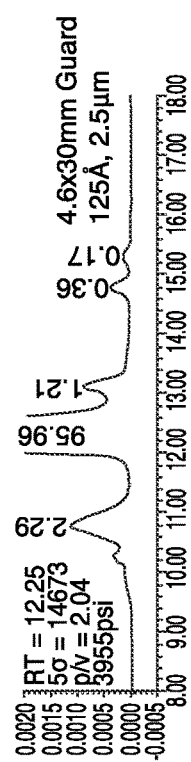

GUARD COLUMN CONFIGURATIONS FOR SIZE EXCLUSION CHROMATOGRAPHY SEPARATIONS

CROSS REFERENCE TO RELATED APPLICATION

This application claims the benefit of U.S. Provisional Application No. 63/010,493 filed Apr. 15, 2020 and entitled "Guard column for SEC Separation of mAb Fragments", the entire disclosure of which is hereby incorporated by reference.

FIELD

The present disclosure relates to guard columns for use with size exclusion chromatography analytical columns particularly those used for size-based separations of proteins and protein fragments.

BACKGROUND

Size-exclusion chromatography (SEC) is a chromatographic method in which molecules in solution are separated by their size. A primary application of SEC chromatography is the fractionation of proteins and other water-soluble polymers. Various SEC columns are commercially available from Waters Corporation (Milford Mass., USA) and other vendors.

Premature failure of SEC columns is typically attributable to the accumulation of sample- or mobile-phase-derived particulates (e.g. protein aggregates, microbes, etc.), or sample excipients (e.g., surfactants, etc.) at the head of the analytical column. The use of a guard column is an effective method for protecting analytical columns from such failure, but typically comes at the expense of separation performance. This performance is compromised due to increased extra-column dispersion (bandspreading) that can arise from the addition of the guard column. Because they lack a specific on-column retention mechanism (e.g., ionic, hydrophobic, chemical, etc.), size-based separation techniques are particularly susceptible to extra-column sources of sample dispersion. Some SEC users mitigate these added dispersive effects by employing guard columns with a relatively high volume of packed bed. Other users performing more demanding separations are unwilling to compromise performance and thus avoid the use of guard columns altogether, opting for shorter analytical column lifetimes. Either of these approaches comes with significant added financial cost.

The approaches outlined in the present disclosure address these issues by substantially preserving optimal separation performance and by offering solutions that do so at a reduced cost. These approaches extend the lifetimes of analytical columns by providing protection from particulate and/or chemical fouling, without significantly compromising the ability of the analytical columns to perform critical separations such as mAb monomer-clip separations where molecular weight differences between species are small.

SUMMARY

In various embodiments, chromatographic systems for size exclusion chromatography (SEC) are provided that comprise an inlet, an outlet, an analytic column having a first interior volume that has a first length and a first cross-sectional area normal to the first length, the first interior volume containing a first stationary phase, and a guard column having a second interior volume that has a second length and a second cross-sectional area normal to the second length, the second interior volume containing a second stationary phase. The inlet is in fluid communication with the guard column, the guard column is in fluid communication with the analytic column, and the analytic column is in fluid communication with the outlet. Moreover, the second length is smaller than the first length, and the second cross-sectional area is smaller than the first cross-sectional area.

In some of these embodiments, the first interior volume is in the form of a first cylinder, where the first length corresponds to a length of the first cylinder and the first cross-sectional area corresponds to a circular cross-section of the first cylinder and/or the second interior volume is in the form of a second cylinder, where the second length corresponds to a length of the second cylinder and the second cross-sectional area corresponds to a circular cross-section of the second cylinder.

In some embodiments, which can be used in conjunction with the above embodiments, the second cross-sectional area is less than 50% of the first cross-sectional area.

In some embodiments, which can be used in conjunction with the above embodiments, the first cross-sectional area ranges from 10 mm$^2$ or less to 120 mm$^2$ or more, for example ranging from 10 mm$^2$ to 20 mm$^2$ to 30 mm$^2$ to 40 mm$^2$ to 50 mm$^2$ to 60 mm$^2$ to 80 mm$^2$ to 100 mm$^2$ to 120 mm$^2$ (in other words, ranging between any two of the preceding values).

In some embodiments, which can be used in conjunction with the above embodiments, the second length is less than 20% of the first length.

In some embodiments, which can be used in conjunction with the above embodiments, the first length ranges from 50 mm or less to 500 mm or more.

In some embodiments, which can be used in conjunction with the above embodiments, the guard column is integrated into an inlet end of the analytical column.

In some embodiments, which can be used in conjunction with the above embodiments, the first and second stationary phases comprise first and second stationary phase particles.

In some embodiments, which can be used in conjunction with the above embodiments, the first stationary phase particles have a diameter ranging from 1 to 10 μm, In some embodiments, which can be used in conjunction with the above embodiments, the first stationary phase particles have an average pore diameter ranging from 50 to 1000 Angstroms.

In some embodiments, which can be used in conjunction with the above embodiments, the first stationary phase particles comprise bulk material comprising covalently attached hydrophilic surface moieties.

In some embodiments, which can be used in conjunction with the above embodiments, the bulk material is a silicon-based inorganic-organic hybrid material.

In some embodiments, which can be used in conjunction with the above embodiments, the covalently attached hydrophilic surface moieties comprise dihydroxylated aliphatic groups.

In some embodiments, which can be used in conjunction with the above embodiments, the covalently attached hydrophilic surface moieties comprise hydroxy-terminated poly (alkylene oxide) groups.

In some embodiments, which can be used in conjunction with the above embodiments, the first stationary phase particles and the second particles are the same or different.

In some embodiments, which can be used in conjunction with the above embodiments, the second particles are non-porous particles.

In some embodiments, which can be used in conjunction with the above embodiments, the second particles are porous particles.

In some embodiments, which can be used in conjunction with the above embodiments, the second particles have a diameter ranging from 1 to 10 µm.

In some embodiments, which can be used in conjunction with the above embodiments, the second particles comprise a bulk material selected from an inorganic material, an organic material, and an inorganic-organic hybrid material.

In some embodiments, which can be used in conjunction with the above embodiments, the bulk material comprises attached hydrophilic surface moieties.

In some embodiments, the present disclosure provides methods of size exclusion chromatography comprising: (a) loading a solution comprising proteins into the inlet of the system of any of the above embodiments and (b) introducing a mobile phase into the inlet of the system in a volume sufficient to elute at least a portion of the proteins though the system and form an eluent stream at the outlet of the system.

BRIEF DESCRIPTION OF THE DRAWINGS

FIGS. 7B-7E contain chromatograms generated using a 4.6×30 mm guard column upstream of a 7.8×300 mm analytical column. The particles packed into the 4.6×30 mm guard column and flow conditions are as follows: 2.5 µm BEH200 particles at 3738 psi (FIG. 7B), 1.7 µm BEH200 particles at 4326 psi (FIG. 7C), 2.5 µm BEH450 particles at 3885 psi (FIG. 7D) and 2.5 µm BEH125 particles at 3955 psi (FIG. 7E). FIG. 7A is a chromatogram generated using the 7.8×300 mm analytical column without the 4.6×30 mm guard column at 3380 psi.

FIGS. 8B-8E contain chromatograms generated using a 7.8×30 mm guard column packed with 2.5 µm BEH200 particles upstream of a 7.8×300 mm analytical column. The flow conditions are as follows: 2.5 µm BEH200 particles at 3618 psi (FIG. 8B), 2.5 µm BEH200 particles at 3716 psi (FIG. 8C), 2.5 µm BEH200 particles at 3594 psi (FIG. 8D) and 2.5 µm BEH200 particles at 3486 psi (FIG. 8E). FIG. 8A is a chromatogram generated using the 7.8×300 mm analytical column without the 7.8×30 mm guard column at 4004 psi.

DETAILED DESCRIPTION

Figure 1:
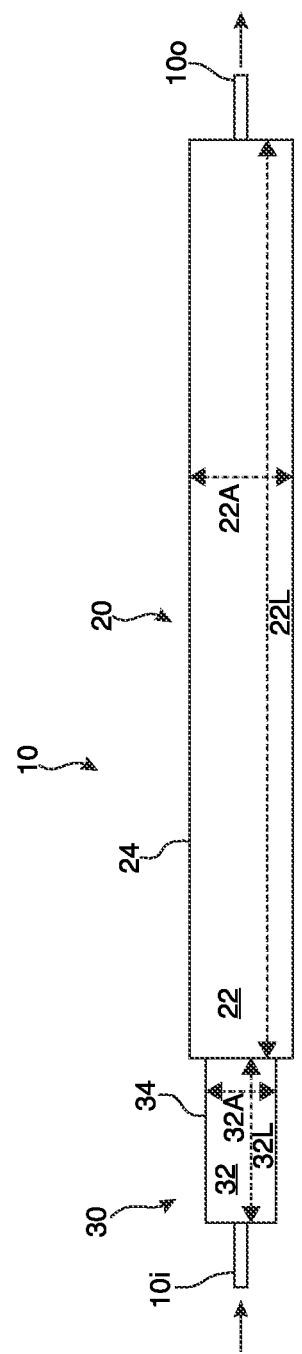
FIG. 1 is a schematic illustration of a chromatographic system for size exclusion chromatography, in accordance with an embodiment of the present disclosure.

Turning to FIG. 1, a chromatographic system 10 for size exclusion chromatography is shown, which comprises an inlet 10i, an outlet 10o, an analytic column 20 having at least one first housing 24 defining a first interior volume 22 containing a first stationary phase, and a guard column 30 having at least one second housing 34 defining a second interior volume 32 containing a second stationary phase. The inlet 10i is in fluid communication with the guard column 30, the guard column 30 is in fluid communication with the analytic column 20, and the analytic column 20 is in fluid communication with the outlet 10o. Flow through the system is in the direction shown by the arrows. The first interior volume 22 has a first length 22L and a first cross-sectional area 22A normal to the first length 22L. One dimension of the first cross-sectional area 22A (i.e., the height of the first cross-sectional area 22A) is shown. The second interior volume 32 has a second length 32L and a second cross-ssectional area 32A normal to the second length 32L. One dimension of the second cross-sectional area 32A (i.e., the height of the second cross-sectional area 32A) is shown. The first stationary phase of the analytic column and the second stationary phase of the guard column may be the same or different. In some embodiments, the second length 32L is smaller than the first length 22L and/or the second cross-sectional area 32A is smaller than the first cross-sectional area 32A. In some embodiments, each of the first and second housings 24, 34 is in the form of a metallic tube.

It should be noted that while a guard column 30 with a packed stationary phase is illustrated in FIG. 1, other guards such as membranes or frit filter devices may be employed in place of the guard column 30.

In some embodiments, the stationary phase material (for the analytic column, the guard column, or both) is a porous stationary phase material. In some of these embodiments, the porous stationary phase material has an average pore diameter ranging from 50 Angstroms or less to 3000 Angstroms or more. For example, the average pore diameter may range anywhere from 50 Angstroms to 100 Angstroms to 250 Angstroms to 500 Angstroms to 1000 Angstroms to 3000 Angstroms (i.e. the average pore diameter may range between any two of the preceding values). Average pore diameter (APD) is measured by conventional porosimetry methods. For sub-500 Angstrom pores, the average pore diameter (APD) can be measured using the multipoint $N_2$ sorption method (Micromeritics ASAP 2400; Micromeritics Instruments Inc., Norcross, Ga.), with APD being calculated from the desorption leg of the isotherm using the BJH method as is known in the art. Hg porosimetry may be used for pores that are 400 Angstrom or greater, as is known in the art.

In some embodiments, the stationary phase material (for the analytic column, the guard column, or both) is in the form of particles. In some of these embodiments, the stationary phase is in the form of spherical particles. Such particles may have a diameter ranging from 0.25 or less to 100 µm or more, for example, ranging from 0.25 µm to 0.5 µm to 1 µm to 2.5 µm to 5 µm to 10 µm to 25 µm to 50 µm to 100 µm.

In some of these embodiments, the analytical and guard columns may be provided with one or more frits (e.g., with at least one frit at each end of the column) to hold the particulate stationary phase material within the interior volume of the column.

Stationary phase materials for use in the analytic column, the guard column, or both, include those that comprise a bulk material (e.g., a particulate bulk material) with covalently attached hydrophilic surface moieties.

Bulk materials may be selected from inorganic bulk materials (e.g., silica, alumina, titanium, cerium, or zirconium or oxides thereof, or ceramic material), organic bulk materials (e.g., organic polymers), and inorganic-organic hybrid materials. "Organic-inorganic hybrid material" includes inorganic-based structures wherein an organic functionality is integral to both the internal or "skeletal" inorganic structure as well as the hybrid material surface. The inorganic portion of the hybrid material may be, e.g., silica, alumina, titanium, cerium, or zirconium or oxides thereof, or ceramic material. Exemplary hybrid materials are shown in U.S. Pat. Nos. 4,017,528, 6,528,167, 6,686,035, 7,175,913 and 7,919,177, the disclosures of which are hereby incorporated in their entirety.

In some embodiments, the bulk material may comprise a silicon-based inorganic-organic hybrid material that includes inorganic regions in which the material comprises silicon atoms having four silicon-oxygen bonds and hybrid regions in which the material comprises silicon atoms having one or more silicon-oxygen bonds and one or more silicon-carbon bonds. In some cases, the hybrid regions may comprise a substituted or unsubstituted alkylene, alkenylene, alkynylene or arylene moiety bridging two or more silicon atoms. For example the hybrid regions may comprise a substituted or unsubstituted $C_1$-$C_{18}$ alkylene, $C_2$-$C_{18}$ alkenylene, $C_2$-$C_{18}$ alkynylene or $C_6$-$C_{18}$ arylene moiety bridging two or more silicon atoms. In particular embodiments, the hybrid regions may comprise a substituted or unsubstituted $C_1$-$C_6$ alkylene moiety bridging two or more silicon atoms, including methylene, dimethylene, or trimethylene moieties bridging two silicon atoms. In particular embodiments, the hybrid regions comprises may comprise ≡Si—$(CH_2)_n$—Si≡ moieties, where n is an integer, and may be equal to 1, 2, 3, 4, 5, 6 or more.

In some embodiments, silicon-based inorganic-organic hybrid materials may be formed by hydrolytically condensing one or more alkoxysilane compounds. Examples of alkoxysilane compounds include, for instance, tetraalkoxysilanes (e.g., tetramethoxysilane (TMOS), tetraethoxysilane (TEOS), etc.), alkylalkoxysilanes such as alkyltrialkoxysilanes (e.g., methyl trimethoxysilane, methyl triethoxysilane (MTOS), ethyl triethoxysilane, etc.) and bis (trialkoxysilyl)alkanes (e.g., bis(trimethoxysilyl)methane, bis(trimethoxysilyl)ethane, bis(triethoxysilyl)methane, bis (triethoxysilyl)ethane (BTE), etc.), as well as combinations of the foregoing. In certain of these embodiments, silicon-based inorganic-organic hybrid materials may be prepared from two alkoxysilane compounds, for example, a tetraalkoxysilane such as TMOS or TEOS and an alkylalkoxysilane such as MTOS or a bis(trialkoxysilyl)alkane such as BTEE. When BTEE is employed, the resulting materials are organic-inorganic hybrid materials, which are referred to as ethylene bridged hybrid (BEH) materials and can offer various advantages over conventional silica, including chemical and mechanical stability. One particular BEH material can be formed from hydrolytic condensation of TEOS and BTEE.

As previously indicated, stationary phase materials for use the analytic column, the guard column, or both, include those that comprise a bulk material with covalently attached hydrophilic surface moieties and, in some embodiments, particles that comprise a particulate bulk material with covalently attached hydrophilic surface moieties. Various bulk materials are described above.

In some embodiments, the covalently attached hydrophilic surface moieties may comprise polyhydroxylated aliphatic groups, for example, dihydroxylated aliphatic groups in which two hydroxyl groups are positioned on adjacent carbon atoms in an aliphatic chain (e.g., dihydroxypropyl groups), also referred to as diol groups. In particular embodiments where the surface of the bulk material comprises silanol groups (e.g. silica and silicon-based inorganic-organic hybrid bulk materials) the covalently attached hydrophilic surface moieties may comprise (dihydroxy-alkoxy)alkyl silane groups, for example, (dihydroxy-$C_1C_4$-alkoxy) $C_1C_4$-alkyl silane groups, such as [3-(2,3-dihydroxypropoxy)propyl]-silane groups.

Various columns for protein-based SEC are available from Waters Corporation (Milford Mass., USA), which contain a porous silicon-based inorganic-organic hybrid material (bridged ethylene hybrid (BEH) particles) surface modified with covalently attached diol groups. Compared to silica-based diol coated particles, BEH particles modified with surface modified diol groups provide a significant reduction in silanol activity, thus reducing undesired ionic interactions between SEC particles and proteins. In addition, the high mechanical strength of the BEH particles enables reduction in particle size to 1.7 µm or less, providing gains in chromatographic efficiency and the ability to effectively reduce SEC analysis times. The BEH-based, SEC particles are also available in 2.5 µm and 3.5 µm sizes, in addition to the 1.7 µm size. The BEH-based, SEC particles are available in pore sizes of 125 Å (BEH125), 200 Å (BEH200) and 450 Å (BEH450).

In other embodiments, the covalently attached hydrophilic surface moieties may comprise PEG-based surface moieties. In some embodiments, bulk materials such as those described above comprise covalently attached hydrophilic surface moieties that comprise hydroxy-terminated poly(alkylene oxide) groups, particularly hydroxy-terminated polyethylene glycol (PEG) groups. In particular embodiments where the surface of the bulk material comprises silanol groups (e.g. silica and silicon-based inorganic-organic hybrid bulk materials such as BEH particles) the covalently attached hydrophilic surface moieties may comprise the formula,

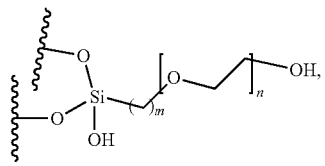

where m is an integer from about 1 to about 10, n is an integer from about 2 to about 50, and the wavy lines indicate points of attachment to the surface of the bulk material. These and other materials are described in co-pending U.S. Patent Application No. 63/079,301 entitled "A Sorbent used to Improve Chromatographic Separations in Size Exclusion Chromatography via Reduced Secondary Interactions," the disclosure of which is hereby incorporated by reference.

Figure 2:
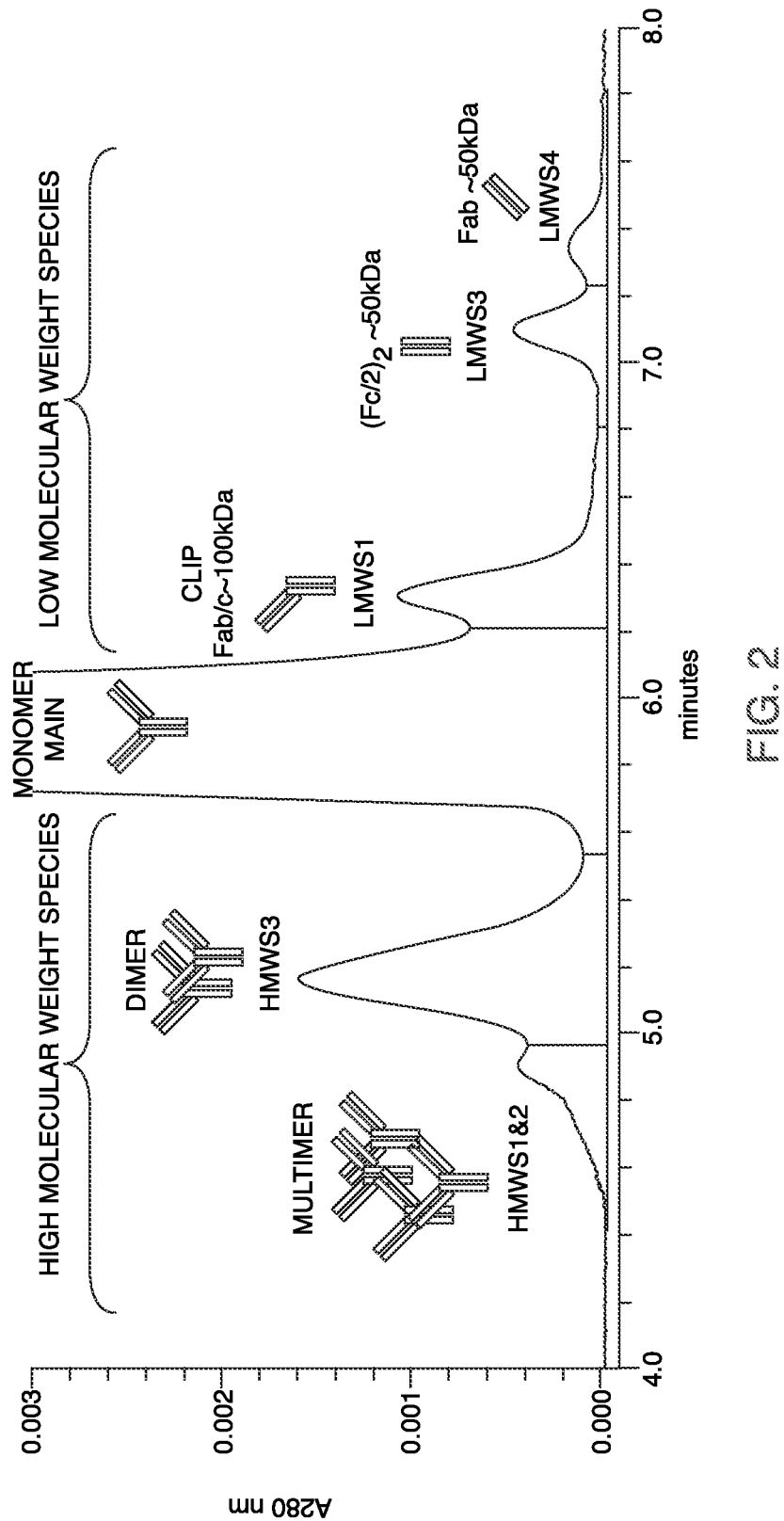
FIG. 2 shows a typical SEC chromatogram for size variant separations of monoclonal antibodies (mAbs).
Figure 2A:
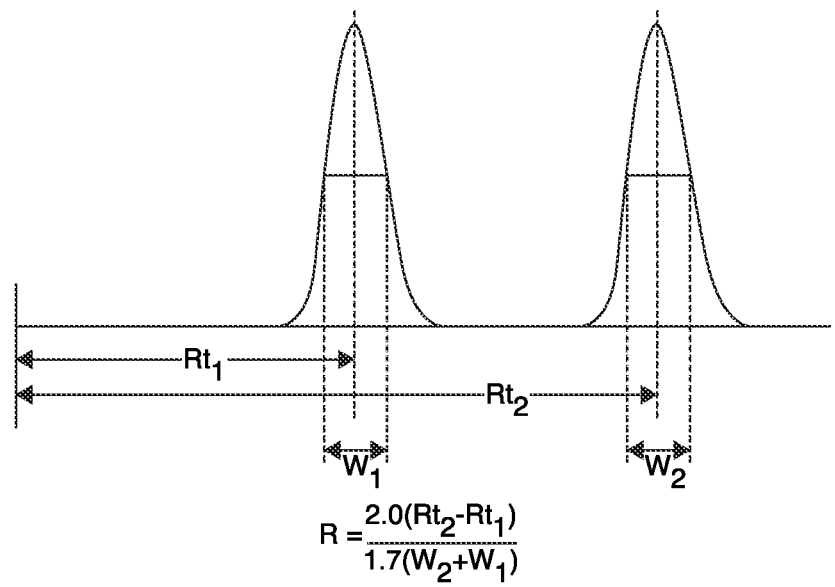
FIG. 2A illustrates a method for the calculation of the resolution at half height between two well-resolved adjacent peaks.
Figure 2B:
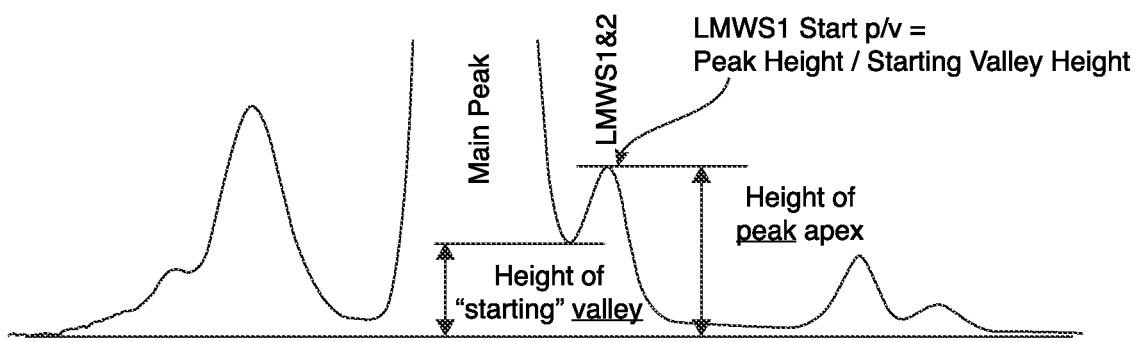
FIG. 2B illustrates a method for the calculation of the peak-height to valley-height ratio (p/v), which is used to describe the quality of the resolution for more difficult to resolve peaks.

A typical SEC chromatogram for size variant separations of monoclonal antibodies (mAbs) is shown in FIG. 2, along with associated nomenclature. One chromatographic parameter that is of interest is the resolution between the main monomer peak and its closest eluting size variant (~100 kDa) referred to as its clip, Fab/c, or LMW1. For peaks that are reasonably resolved the USP resolution at half height (R(USP,HH)) is used to describe the quality of the resolution (see FIG. 2A). For more difficult to resolve peaks, on the other hand, the peak-height to valley-height ratio (p/v) is used to describe the quality of the resolution (see FIG. 2B). In this calculation the peak height refers to the smallest of 2 poorly resolved peaks and the valley height is that which lies between the 2 poorly resolved peaks.

Various new approaches to guard columns for SEC columns, including chromatographic systems like that shown in FIG. 1, among others, are described herein which can be employed in connection with chromatographic systems for size exclusion chromatography (SEC). As previously noted, size-based separation techniques are highly susceptible to extra-column sources of sample dispersion. Such dispersion may be caused by various factors, including added dead volume and/or poor quality fitting and tubing connections in the overall HPLC system located between the sample injector and the system's detector. Placing a guard column immediately upstream of the analytical column inevitably adds both dead-volume and connections. By reducing sources of extra-column dispersion associated with SEC guard columns, however, it is possible to maintain sufficient resolution of critical size-based separations (such as mAb monomer-clip separations) where molecular weight differences between species are small, while providing protection from particulate and chemical fouling of the analytical column.

In accordance with the present disclosure, reduction of extra-column dispersion contribution from the guard column may be achieved by approaches that include, but are not limited to, one or more of the following: reducing the guard column interior volume diameter (and thus reducing the guard column interior volume cross-sectional area), reducing the guard column interior volume length, reducing the number of connections required, modifying the type of connections, modifying the interior volume geometry of the guard column (including conical, tapered, or other non-cylindrical geometries), utilizing alternative stationary phases for the guard column such as non-porous particles, utilizing stationary phases having mono-dispersed particle size, utilizing stationary phases having different particle sizes (e.g., using guard column particles having a diameter that is at least 25% larger, or at least 25% smaller, than a diameter of the analytical column particles), utilizing stationary phases having different particle size distributions, utilizing stationary phases having different pore sizes (e.g., using guard column particles having an average pore diameter that is at least 25% larger, or at least 25% smaller, than an average pore diameter of the analytical column particles), utilizing stationary phases having different pore size distributions, utilizing membranes as guards in place of packed bed guard columns, and/or utilizing frit filter devices as guards in place of packed bed guard columns, among other approaches.

Particles for use in the packed bed guard columns of the present disclosure may be the same as or different from the particles used in the coupled analytic column. Thus, guard column particles may include any of the particles described above.

In some embodiments, a guard column may be provided in which an interior volume of the guard column has a cross-sectional area that is less than 50% of the cross-sectional area of the interior volume of the analytical column employed. For example, the cross-sectional area of the interior volume of the guard column may range from 10% to 20% to 30% to 40% to 50% of the cross-sectional area of the interior volume of the analytical column. In some embodiments, the interior volume of the analytical column has a width ranging from 4 mm to 10 mm, with 4.6 mm and 7.8 mm widths being commonly found in the art.

In some embodiments, a guard column may be provided in which a length of the interior volume of the guard column is less than 20% of the length of the interior volume of the analytical column employed. For example, the length of the interior volume of the guard column may range from 1% to 2% to 3% to 5% to 10% to 20% of the length of the interior volume of the analytical column. In some embodiments, the length of the interior volume of the analytical column may from 50 mm or less to 500 mm or more, for example, ranging from 50 mm to 100 mm to 150 mm to 200 mm to 300 mm to 400 mm to 500 mm.

Chromatographic systems in accordance with the present disclosure may also employ integral guard columns where no ferrule connections are required and the guard column is integrated into the analytical column inlet end nut (such as is found in the VanGuard™ FIT from Waters Corporation, in which extraneous tubing and ferrule connections between the guard column and the analytical column are removed, allowing connections to be made easily and reproducibly, and allowing extra-column volume to be reduced). Direct-connect style guards (such as is found in VanGuard™ Pre-columns), which have a one-piece, design that provides higher efficiency, greater resolution, and increased throughput of separations, may also be employed. In some embodiments, use of Inline Filter (frit only) kits from Waters Corporation may be employed.

Further aspects of the present disclosure pertain to the methods that comprise: (a) loading a solution comprising proteins into the inlet of a system having any of the guard and analytic column configurations described above and (b) introducing a mobile phase into the inlet of the system in a volume sufficient to elute at least a portion of the proteins though the system and form an eluent stream at the outlet of the system. In some embodiments, the proteins are monoclonal antibodies. In some embodiments, the mobile phase is an aqueous mobile phase, for example, a buffered aqueous mobile phase such as the sodium phosphate/KCl buffer solution used in the Examples below.

EXAMPLES

In the following Examples, mAb size variant testing was performed under the following experimental conditions (or under analogous experimental conditions):
System H-Class-10 (H-Class Bio)
Waters Acquity UPLC H-Class System with FTN Sample manager, 1 mm Needle placement from bottom; TUV with Titanium Flow Cell; QSM; and 30 cm CH-A Column Heater (Active)
mAb Size Variant Test Isocratic Conditions
Mobile Phase A: 50 mM sodium phosphate buffer+200 mM KCl
Column Temperature: 35° C.
UV Wavelength: 280 nm
Injection Volume: 10 µL
Flow Rate: 575 µL/minute
Needle Wash: Milli-Q water
Purge: Milli-Q water
Seal Wash: 10% methanol/90% Milli-Q Water
Sample (Concentration)
1. Waters mAb Size Variant Standard (SKU: 186009429) (2.28 mg/mL)
2. Uracil in mobile phase A (0.1 mg/mL)
Test Sequence for Each Chromatogram Reported
1. Mobile Phase A test flow rate equilibrate @ 1.15 mL/min (60 min) (35° C.)
2. Mobile Phase A test flow rate equilibrate @ 0.575 mL/min (10 min) (35° C.)
3. 1 Injection of 10 µL mAb size variant (23 min) (35° C.) in Mobile Phase A @ 0.575 mL/min (22.8 µg load)
4. Tg conditioning (4 injections) (180 µg load)
5. 2 Injections of 10 µL mAb size variant (23 min) (35° C.) in Mobile Phase A @ 0.575 mL/min (45.6 µg load)
6. 3 injections of Uracil efficiency test in buffer @ 1.0 mL/min (30° C.)
2nd injection results were reported.

Example 1

In this example, the effects of guard column diameter and particle type and diameter on clip resolution were investigated. The analytical SEC column in all cases was a 4.6×150 mm VanGuard™ FIT analytical column. Two guard column sizes were tested: a 3.9×5 mm VanGuard™ Cartridge Column and a 2.1×5 mm VanGuard™ Cartridge Column. Four particle types were tested: 1.7 µm BEH200 particles, 2.5 µm BEH200 particles, 3.5 µm BEH200 particles and 3 µm non-porous poly(styrene-divinyl benzene) coated particles.

Figure 3A:
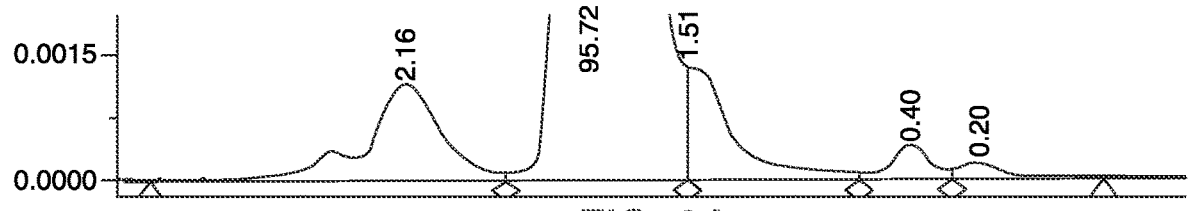
FIG. 3A is a chromatogram generated using the 4.6×150 mm analytical column with the guard column bypassed.
Figure 3B:
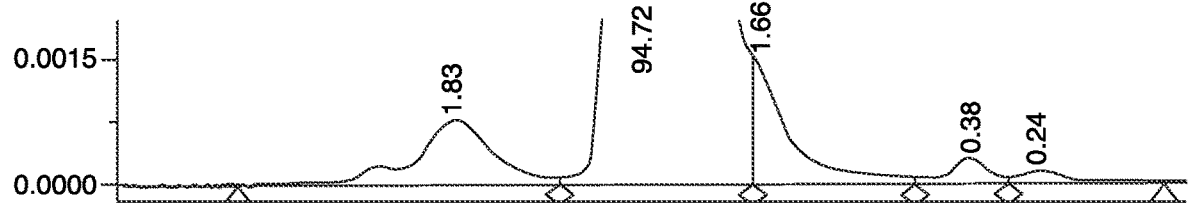
FIGS. 3B-3E contain chromatograms generated using a 3.9×5 mm guard column upstream of a 4.6×150 mm analytical column with the guard column containing four differing particles types: 1.7 µm BEH200 particles (FIG. 3B), 2.5 µm BEH200 particles (FIG. 3C), 3.5 µm BEH200 particles (FIG. 3D), 3 µm non-porous poly(styrene divinyl benzene particles (FIG. 3E).
Figure 3C:
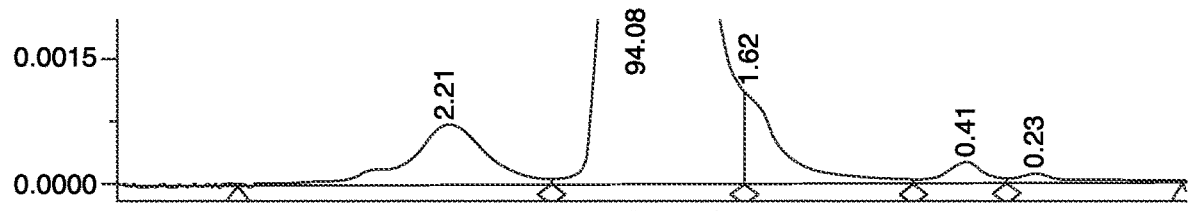
Figure 3D:
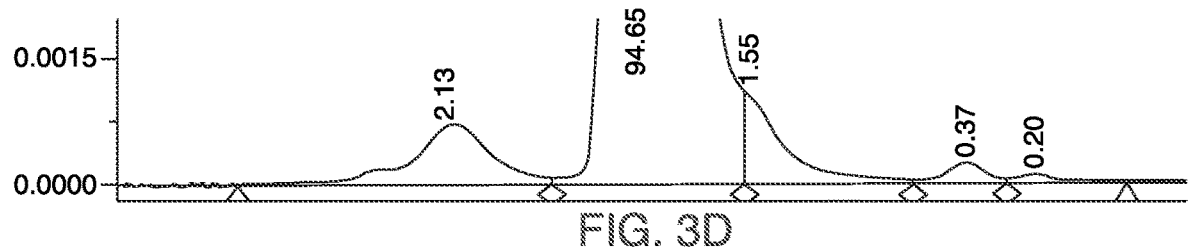
Figure 3E:
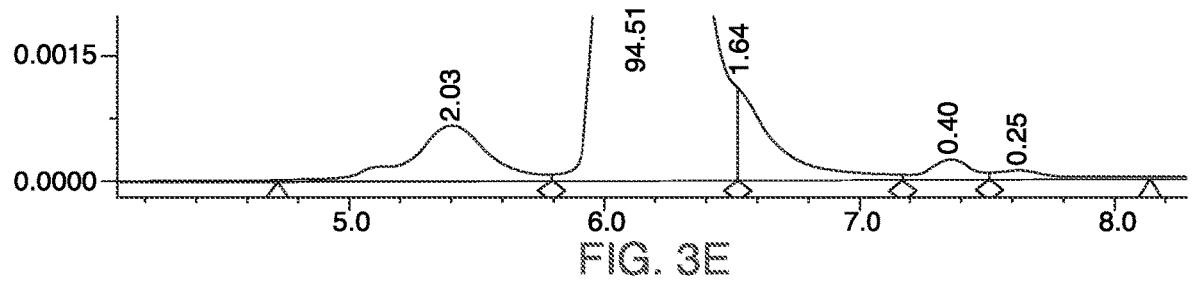

FIGS. 3B-3E contain chromatograms generated using the 3.9×5 mm guard column upstream of the 4.6×150 mm analytical column with the guard column containing four differing particles types: 1.7 µm BEH200 particles (FIG. 3B), 2.5 µm BEH200 particles (FIG. 3C), 3.5 µm BEH200 particles (FIG. 3D), 3 µm non-porous poly(styrene divinyl benzene particles (FIG. 3E). FIG. 3A is a chromatogram generated using the 4.6×150 mm analytical column with the guard column bypassed.

Figure 4A:
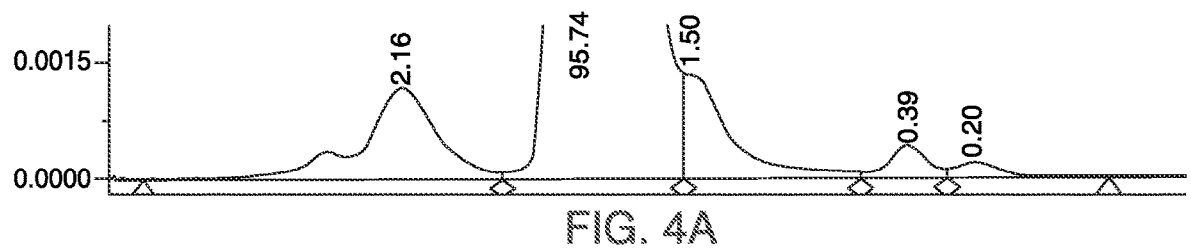
FIG. 4A is a chromatogram generated using the 4.6×150 mm analytical column with the guard column bypassed.
Figure 4B:
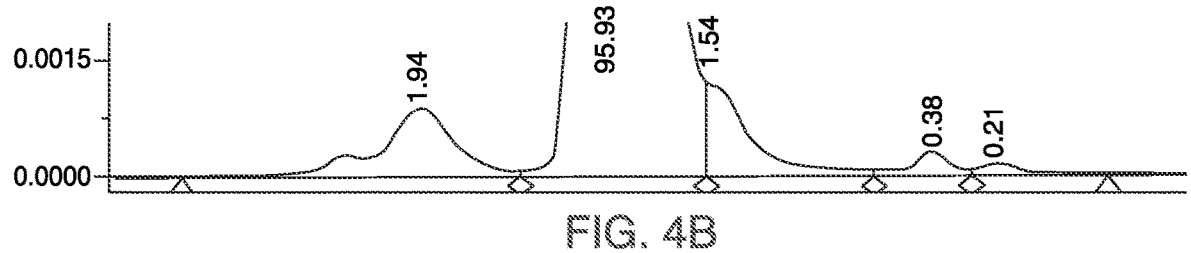
FIGS. 4B-4E contain chromatograms generated using a 2.1×5 mm guard column upstream of a 4.6×150 mm analytical column with the guard column containing four differing particles types: 1.7 µm BEH200 particles (FIG. 4B), 2.5 µm BEH200 particles (FIG. 4C), 3.5 µm BEH200 particles (FIG. 4D), 3 µm non-porous poly(styrene divinyl benzene particles (FIG. 4E).
Figure 4C:
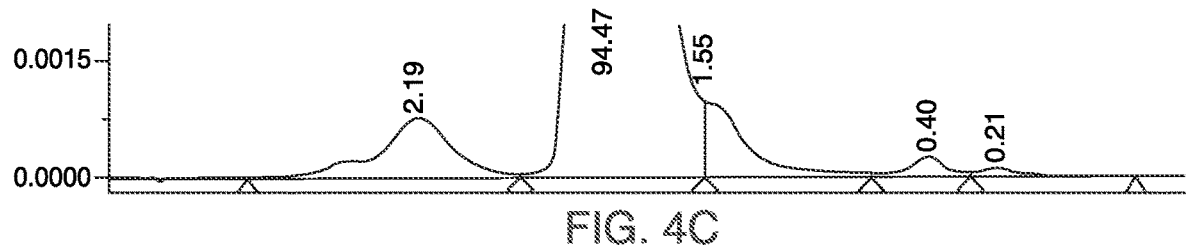
Figure 4D:
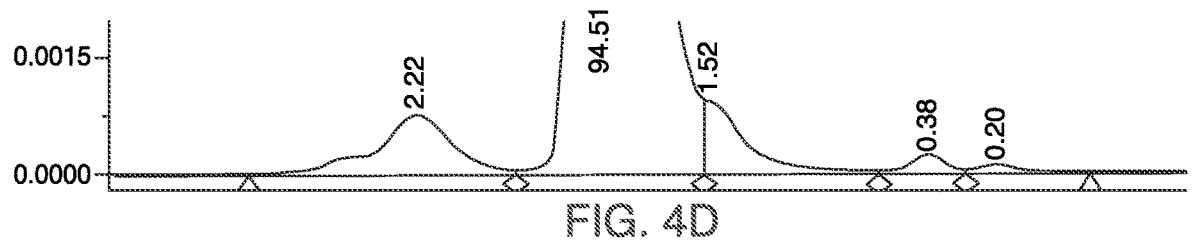
Figure 4E:
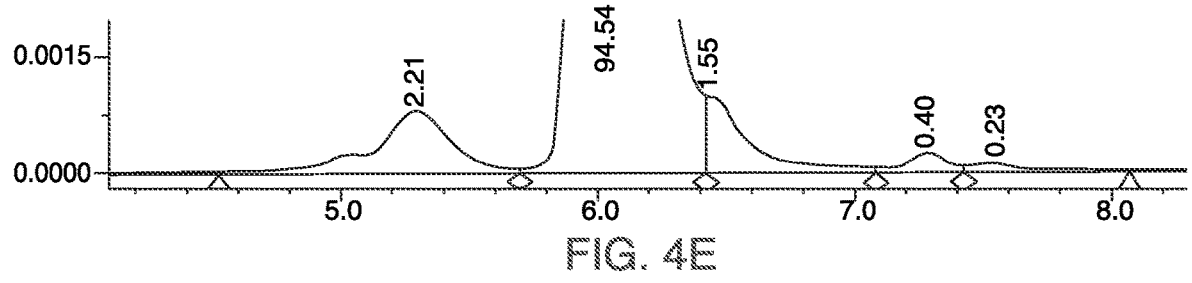

FIGS. 4B-4E contain chromatograms generated using the 2.1×5 mm guard column upstream of the 4.6×150 mm analytical column with the guard column containing four differing particles types: 1.7 µm BEH200 particles (FIG. 4B), 2.5 µm BEH200 particles (FIG. 4C), 3.5 µm BEH200 particles (FIG. 4D), 3 µm non-porous poly(styrene divinyl benzene particles (FIG. 4E). FIG. 4A is a chromatogram generated using the 4.6×150 mm analytical column with the guard column bypassed.

As can be seen by comparing FIGS. 3A-3E with FIGS. 4A-4E, the 2.1 mm diameter guard column had resolution performance that was much closer to the bypass version than the 3.9 mm diameter guard column. On the other hand, results were relatively independent of particle size and type, with the non-porous inert PS-DVB particles appearing to perform just as well as the BEH particles.

Example 2

In this example, the effects of various guards on clip resolution were investigated. The analytical SEC column in all cases was a 4.6×150 mm analytical column (standard version). Four guards were employed: a Waters ACQUITY™ Inline Filter, which contains a 0.2 µm stainless steel filter, a 2.1×5 mm VanGuard™ Pre-column (Direct-Connect type) containing 1.7 µm BEH200 particles, a 2.1×5 mm VanGuard™ Pre-column (Direct-Connect type) containing 2.5 µm BEH200 particles, and a Waters Direct Connect HP 2.1×30 mm pre-column containing 2.5 µm BEH200 particles.

Figure 5A:
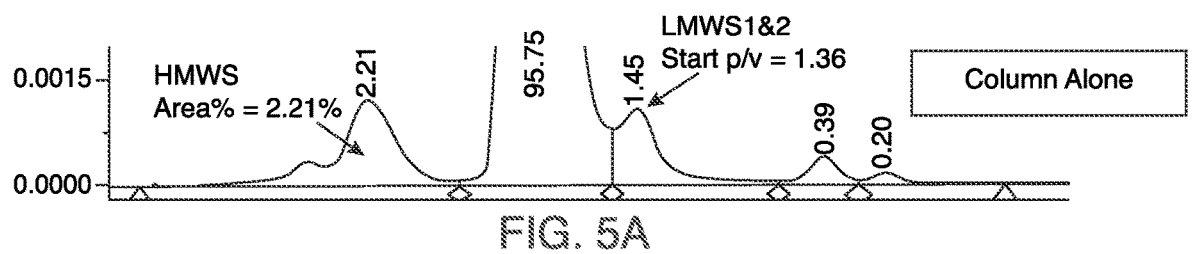
FIG. 5A is a chromatogram generated using the 4.6×150 mm analytical column with the guard column bypassed.
Figure 5B:
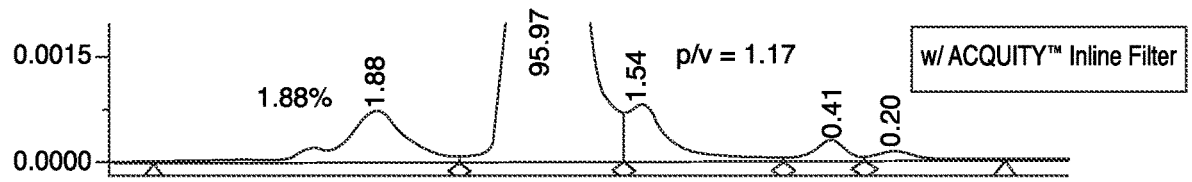
FIGS. 5B-5E contain chromatograms generated using guards upstream of a 4.6×150 mm analytical column as follows: a Waters ACQUITY™ Inline Filter (FIG. 5B), a 2.1×5 mm guard column containing 1.7 µm BEH200 particles (FIG. 5C), a 2.1×5 mm guard column containing 2.5 µm BEH200 particles (FIG. 5D), and a 2.1×30 mm guard column containing 2.5 µm BEH200 particles (FIG. 5E).
Figure 5C:
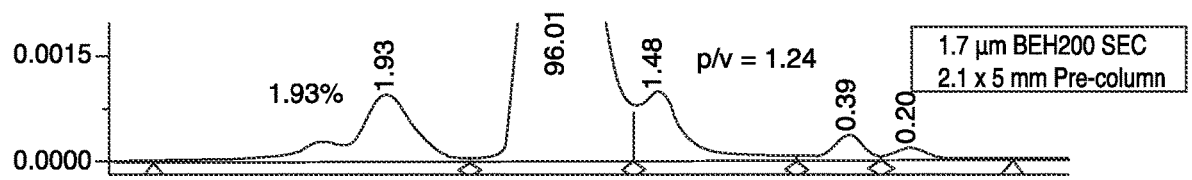
Figure 5D:
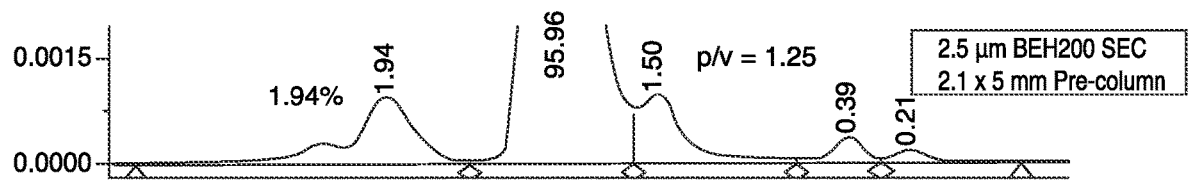
Figure 5E:
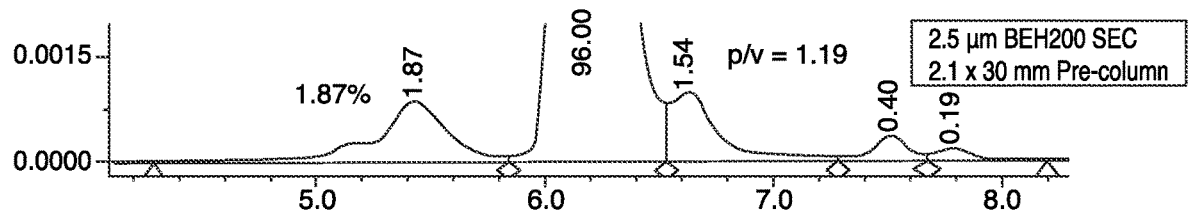

FIGS. 5B-5E contain chromatograms generated using these guards upstream of the 4.6×150 mm analytical column as follows: the Waters ACQUITY™ Inline Filter (FIG. 5B), the 2.1×5 mm guard column containing 1.7 µm BEH200 particles (FIG. 5C), the 2.1×5 mm guard column containing 2.5 µm BEH200 particles (FIG. 5D), and the 2.1×30 mm guard column containing 2.5 µm BEH200 particles (FIG. 5E). FIG. 5A is a chromatogram generated using the 4.6×150 mm analytical column with the guard column bypassed.

In contrast to the VanGuard™ FIT analytical column of Example 1, clip is relatively well resolved in all cases using the standard version of the 4.6×150 mm column. There is some clip resolution loss when paired with a Waters ACQUITY™ inline filter (which contains frits only). Clip resolution is generally preserved when coupled with the packed-bed (direct-connect) pre-columns. Particle size did not significantly impact performance, nor did guard column length.

Example 3

In this example, the effect of a 4.6×30 mm Waters guard column containing 1.7 µm BEH200 particles on clip resolution was investigated. The analytical SEC column in each case was a Waters 7.8×300 mm analytical column containing 2.5 µm BEH200 particles.

Figure 6A:
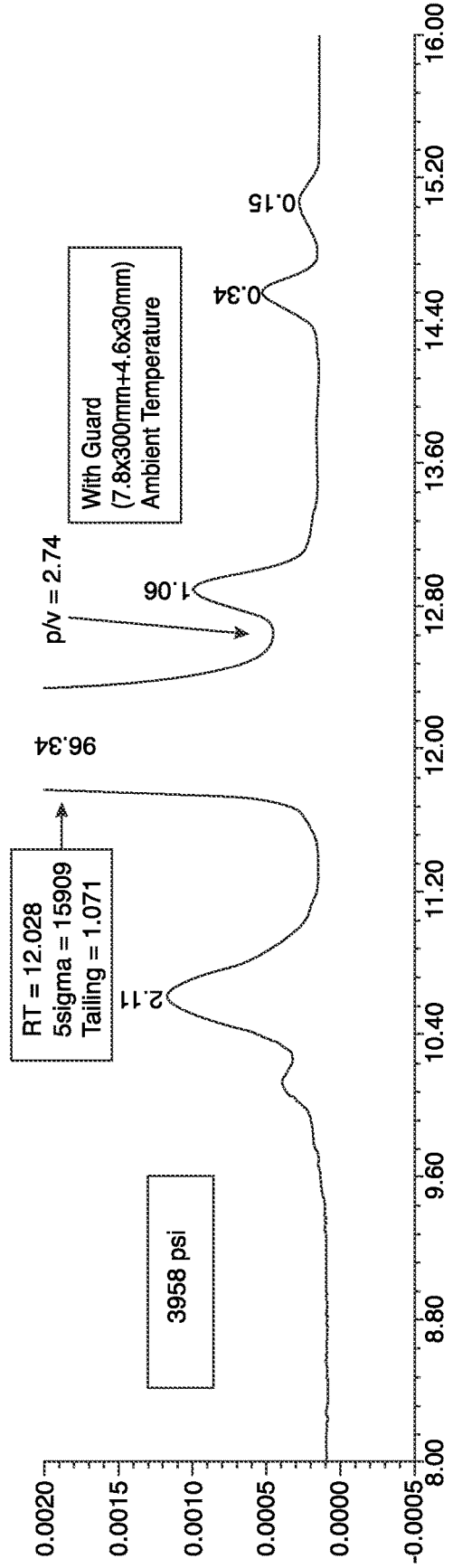
FIG. 6A is a chromatogram generated using a 4.6×30 mm guard column upstream of a 7.8×300 mm analytical column.
Figure 6B:
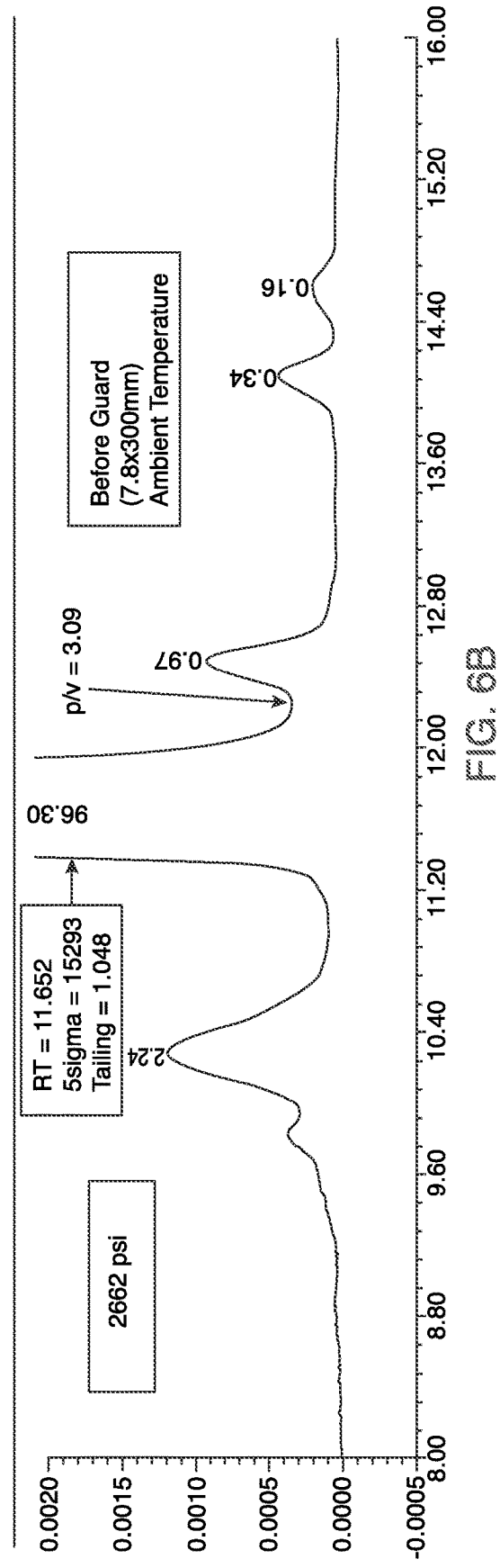
FIG. 6B is a chromatogram generated using the 7.8×300 mm analytical column without the 4.6×30 mm guard column.

FIG. 6A is a chromatogram generated using the 4.6×30 mm guard column upstream of the 7.8×300 mm analytical column. FIG. 6B is a chromatogram generated using the 7.8×300 mm analytical column without the 4.6×30 mm guard column.

As seen from these chromatograms, there is only a slight loss in clip resolution when using the 4.6×30 mm guard column.

Example 4

In this example, the effects of guard column diameter and particle type and diameter on clip resolution were investigated. The analytical SEC column in each case was a Waters XBridge 7.8×300 mm analytical column containing 2.5 µm BEH200 particles. Two guard columns were tested: a 4.6×30 mm Waters guard column and a 7.8×30 mm Waters guard column. Four particle types were tested: 1.7 µm BEH200 particles, 2.5 µm BEH125 particles, 2.5 µm BEH200 particles and 2.5 µm BEH450 particles.

FIGS. 7B-7E contain chromatograms generated using the 4.6×30 mm guard column upstream of the 7.8×300 mm analytical column. The particles packed into the 4.6×30 mm guard column and flow conditions are as follows: 2.5 µm BEH200 particles at 3738 psi (FIG. 7B), 1.7 µm BEH200 particles at 4326 psi (FIG. 7C), 2.5 µm BEH450 particles at 3885 psi (FIG. 7D) and 2.5 µm BEH125 particles at 3955 psi (FIG. 7E). FIG. 7A is a chromatogram generated using the 7.8×300 mm analytical column without the 4.6×30 mm guard column at 3380 psi.

FIGS. 8B-8E contain chromatograms generated using the 7.8×30 mm guard column packed with 2.5 µm BEH200 particles upstream of the 7.8×300 mm analytical column. The flow conditions are as follows: 2.5 µm BEH200 particles at 3618 psi (FIG. 8B), 2.5 µm BEH200 particles at 3716 psi (FIG. 8C), 2.5 µm BEH200 particles at 3594 psi (FIG. 8D) and 2.5 µm BEH200 particles at 3486 psi (FIG. 8E). FIG. 8A is a chromatogram generated using the 7.8×300 mm analytical column without the 7.8×30 mm guard column at 4004 psi.

The invention claimed is:

1. A chromatographic system for size exclusion chromatography (SEC) comprising an inlet, an outlet, an analytic column having a first interior volume containing a first stationary phase, and a guard column having a second interior volume containing a secondary stationary phase, the inlet in fluid communication with the guard column, the guard column in fluid communication with the analytic column, and the analytic column in fluid communication with the outlet, wherein the first interior volume has a first length and a first cross-sectional area normal to the first length, wherein the second interior volume has a second length and a second cross-sectional area normal to the second length, wherein the second length is smaller than the first length and wherein the second cross-sectional area is smaller than the first cross-sectional area which ranges from 10 mm² to 40 mm², wherein the guard column has a diameter of 3.9 mm or less and is integrated into an inlet end of the analytical column and no ferrule connections are between the guard column and the inlet end of the analytical column.

2. The chromatographic system of claim 1, wherein the first interior volume is in the form of a first cylinder, the first length corresponds to a length of the first cylinder, the first cross-sectional area corresponds to a circular cross-section of the first cylinder, the second interior volume is in the form of a second cylinder, the second length corresponds to a length of the second cylinder and the second cross-sectional area corresponds to a circular cross-section of the second cylinder.

3. The chromatographic system of claim 1, wherein the second cross-sectional area is less than 50% of the first cross-sectional area.

4. The chromatographic system of claim 1, wherein the second length is less than 20% of the first length.

5. The chromatographic system of claim 1, wherein the first length ranges from 50 mm to 500 mm.

6. The chromatographic system of claim 1, wherein the first and second stationary phases comprise first and second stationary phase particles.

7. The chromatographic system of claim 6, wherein the first stationary phase particles have a diameter ranging from 1 to 10 µm.

8. The chromatographic system of claim 7, wherein the first stationary phase particles have an average pore diameter ranging from 50 to 1000 Angstroms.

9. The chromatographic system of claim 7, wherein the first stationary phase particles comprise bulk material comprising covalently attached hydrophilic surface moieties.

10. The chromatographic system of claim 9, wherein the bulk material is a silicon- based inorganic-organic hybrid material.

11. The chromatographic system of claim 10, wherein the covalently attached hydrophilic surface moieties comprise dehydroxylated aliphatic groups.

12. The chromatographic system of claim 10, wherein the covalently attached hydrophilic surface moieties comprise hydroxy-terminated poly (alkylene oxide) groups.

13. The chromatographic system of claim 6, wherein the first stationary phase particles and the second stationary phase particles are the same or different.

14. The chromatographic system of claim 13, wherein the second stationary phase particles are non-porous particles.

15. The chromatographic system of claim 13, wherein the second stationary phase particle are porous particles.

16. The chromatographic system of claim 13, wherein the second stationary phase particles have a diameter ranging from 1 to 10 µm.

17. The chromatographic system of claim 14, wherein the second stationary phase particles comprises a bulk material selected from an inorganic material, an organic material, and an inorganic-organic hybrid material.

18. The chromatographic system of claim 17, wherein the bulk material comprises attached hydrophilic surface moieties.

19. A method of size exclusion chromatography comprising: (a) loading a solution comprising proteins into the inlet of the system of claim 1, and (b) introducing a mobile phase into the inlet of the system in a volume sufficient to elute at least a portion of the proteins through the system and form an eluent stream at the outlet of the system.

* * * * *